Nov. 30, 1965   F. R. ELLEDGE, JR   3,221,300
WARNING SIGNAL DEVICE
Filed Sept. 14, 1961   4 Sheets-Sheet 1
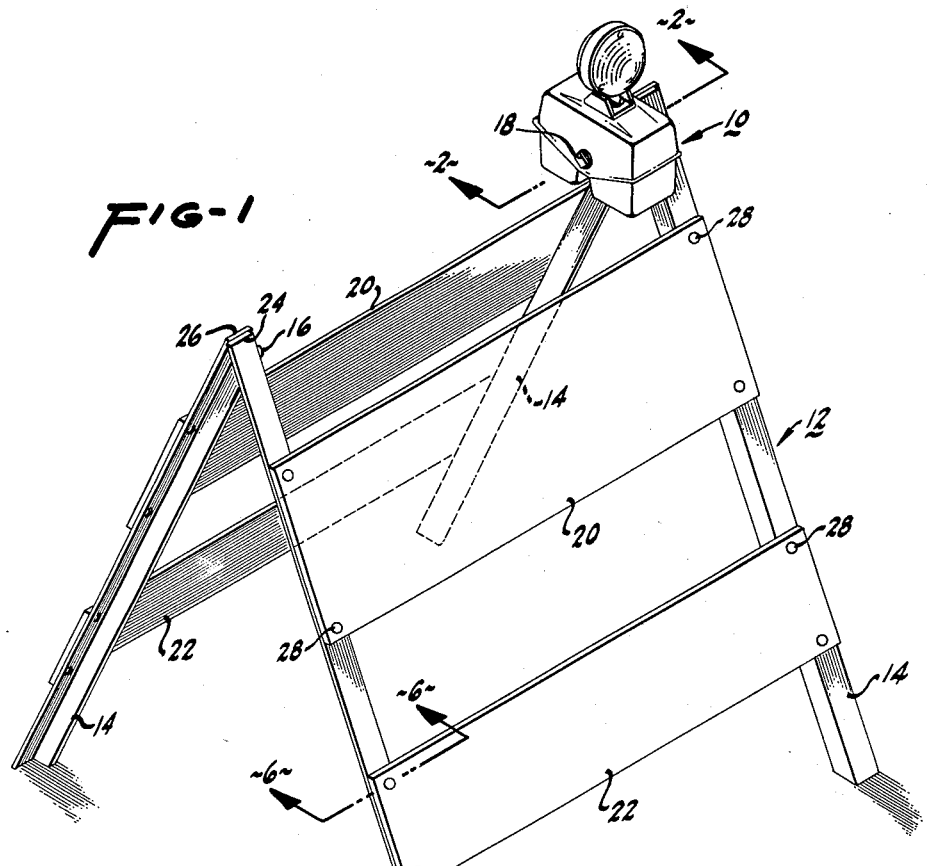
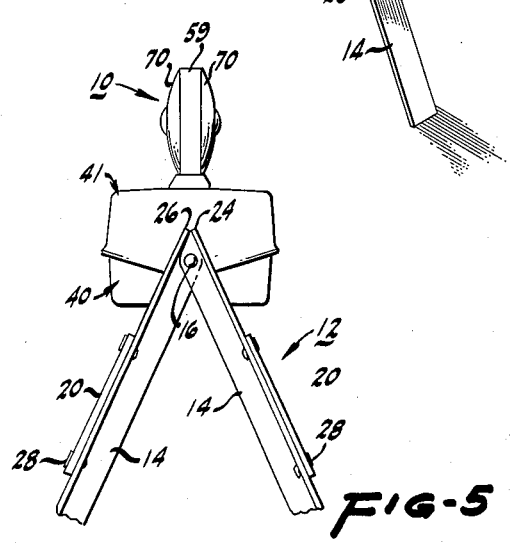
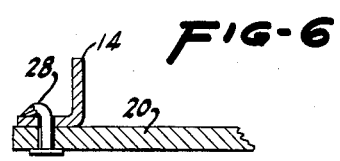
INVENTOR.
FRED R. ELLEDGE, JR.
BY
ATTORNEY

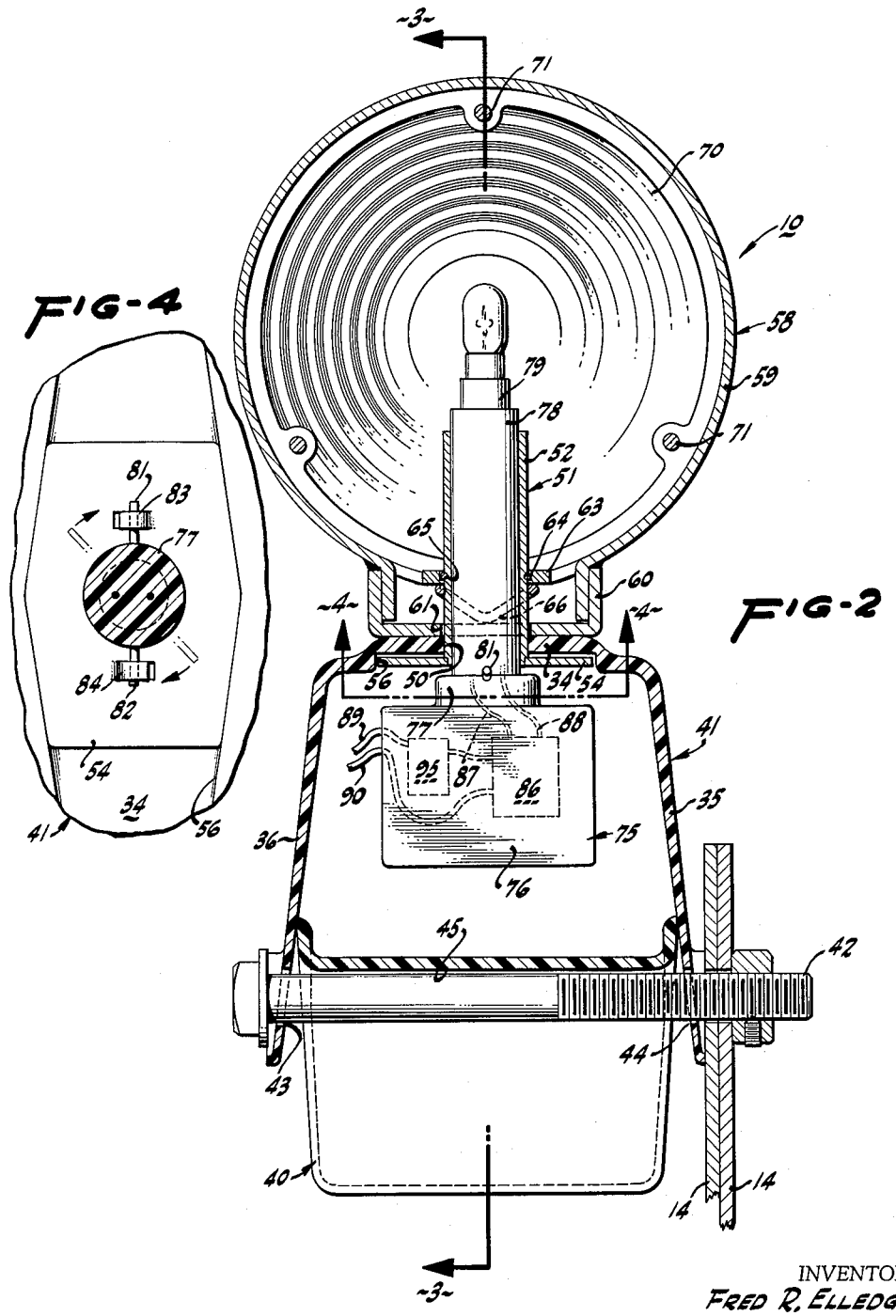

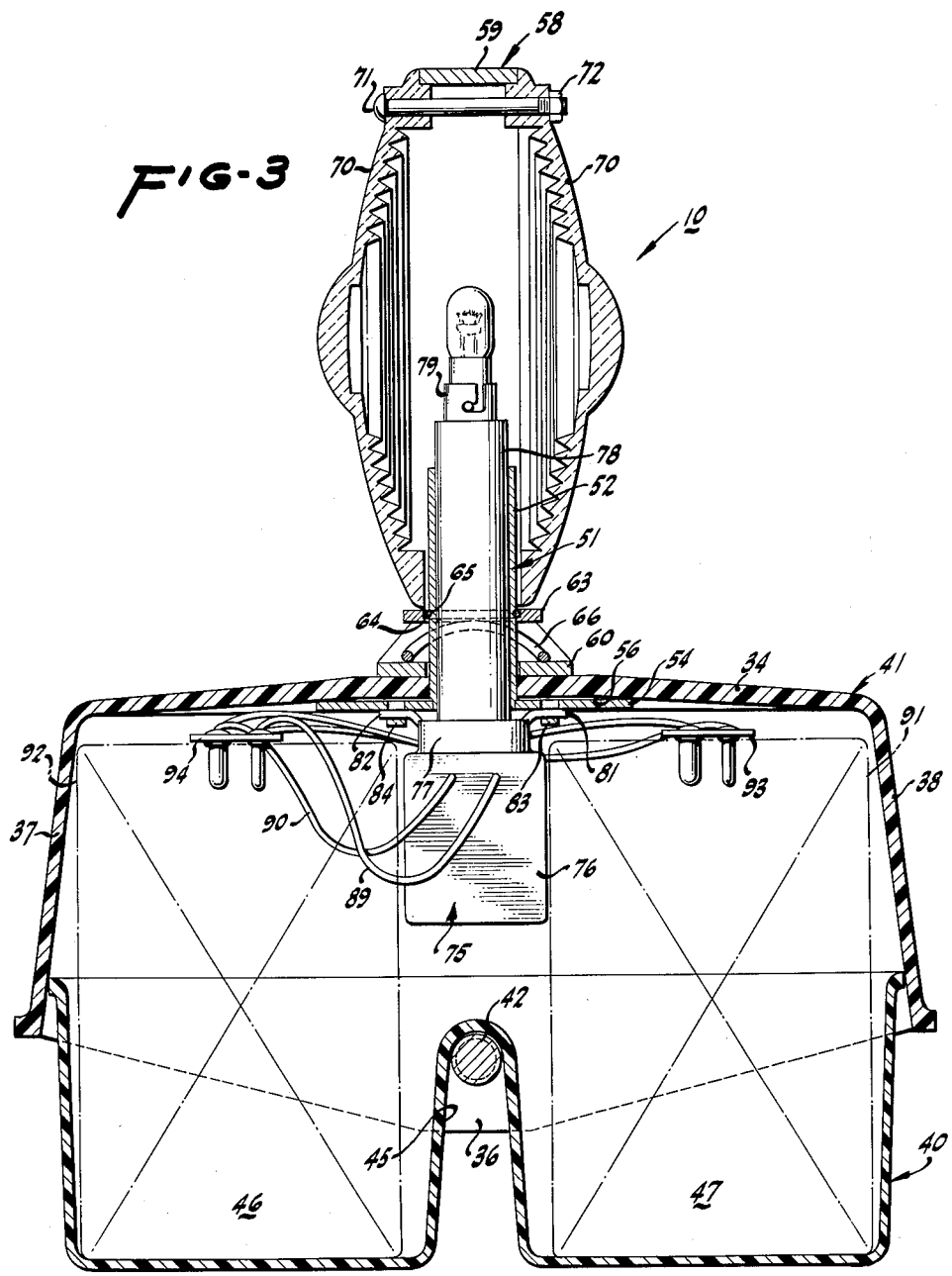

Nov. 30, 1965 F. R. ELLEDGE, JR 3,221,300
WARNING SIGNAL DEVICE
Filed Sept. 14, 1961 4 Sheets-Sheet 4

INVENTOR.
FRED R. ELLEDGE, JR.
BY
ATTORNEY

United States Patent Office 3,221,300
Patented Nov. 30, 1965

1

3,221,300
WARNING SIGNAL DEVICE
Fred Russell Elledge, Jr., 2332 Eva St., Napa, Calif.
Filed Sept. 14, 1961, Ser. No. 138,091
8 Claims. (Cl. 340—81)

This invention relates to a flasher construction and more particularly to a battery operated flasher which may be mounted upon a barricade placed to warn the public of some danger or unusual condition.

Barricades having flashers mounted thereon are commonly used to call the public's attention to some temporary, dangerous or unusual condition such as excavations or road repairs. Particularly at night, when the barricade cannot be seen, the flasher provides the sole warning that caution must be exercised. In order to be effective, a flasher must be very rugged and reliable since its effectiveness depends on uninterrupted service, especially during night-time, under all weather conditions.

Additionally, it is desirable to reduce its maintenance requirements to a minimum so that the flasher may be quickly disassembled to replace run-down batteries or burned-out bulbs. Also, their initial costs should be an absolute minimum so as not to deter potential users from purchasing in sufficient quantities so that a reasonably large number thereof may be placed around construction jobs to give the public notice of some dangerous or unusual condition.

Many flashers known heretofore have been found wanting in one or more respects. For example, some flashers are unreliable, others require a great deal of maintenance, or some constantly require replacement of batteries for failure to switch them off when not in use. All of the prior art flashers have been found wanting in the ease with which they may be disassembled for mounting or maintenance purposes.

It is therefore an object of this invention to provide a flasher construction of low initial cost, great durability and dependability, and practically uninfluenced by environmental conditions, such as rain, heat, cold, dust, etc.

It is a further object of this invention to provide a flasher construction which may be easily disassembled for service such as the replacement of batteries or bulbs and which require less maintenance time than has been known heretofore.

It is still another object of this invention to provide a flasher construction which only operates when standing upright and which shuts itself off when lying on its side.

It is still another object of this invention to provide a flasher construction including a potted unit containing the switch, the transistor circuitry and the light bulb socket and which thereby becomes impervious to moisture, dust, insects and other environmental factors.

It is still a further object to provide a barricade to which the flasher construction of this invention may be mounted and which is attached thereto in a theft-proof manner.

Other objects and a better understanding of the invention may be had by reference to the following description taken in conjunction with the accompanying drawings in which:

FIG. 1 is a perspective view of a flasher construction mounted upon a barricade in accordance with this invention.

FIG. 2 is an enlarged sectional view taken along the lines 2—2 of FIG. 1.

FIG. 3 is a sectional view taken along the lines 3—3 of FIG. 2.

FIG. 4 is an enlarged sectional view taken along the lines 4—4 of FIG. 2.

2

FIG. 5 is a reduced side view of the flasher construction mounted on the barricade as shown in FIG. 1.

FIG. 6 is an enlarged sectional view taken along the lines 6—6 of FIG. 1.

Figure 7:
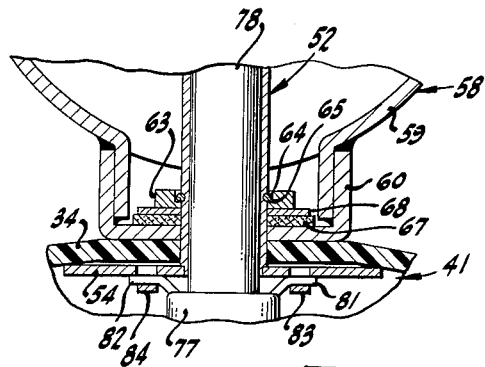
Figure 8:
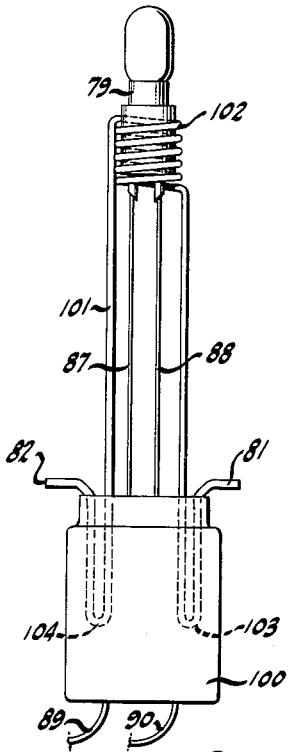
Figure 9:
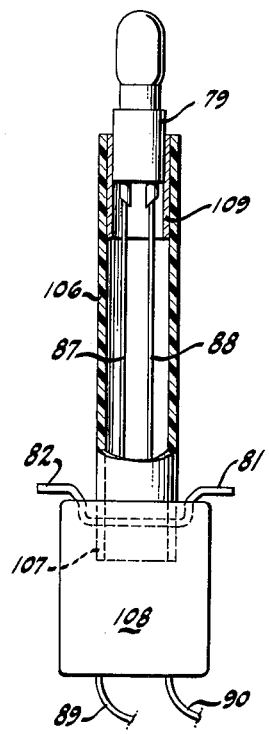

FIG. 7 is a partial view in cross section of an alternate embodiment of the fastening means for holding the head assembly of the flasher construction in place; and FIGS. 8 and 9 are side elevational views of different embodiments of the encapsulating body structure containing the electronic flashing circuitry.

Referring now to the drawings and particularly to FIGS. 1 and 5 thereof, there is shown the flasher construction of this invention generally designated by reference numeral 10, mounted upon a barricade 12. Barricade 12 includes four legs 14 of mill rolled angle section stock having their upper portions pivotably connected to one another in pairs by means of pivot pins 16 and 18 respectively. Pivot pins 16 and 18 may comprise conventional bolts passing through holes drilled into the upper end portion of each leg and being secured in place with a threaded nut. As will be explained in connection with the description of flasher construction 10, pivot pin 18 may comprise the flasher locking bolt.

Opposite pairs of legs are joined to one another by a pair of top boards 20 and a pair of bottom boards 22 to form barricade 12. Boards 20 and 22 are also useful as a notice board upon which some notice of warning may be painted or otherwise affixed. The upper portions of legs 14 have one or both corners removed from their contiguous sides to permit opening the pair of legs about the pivot point (as shown best in FIG. 5), the maximum angular separation being determined by the position of pivot pins 16 and 18 with respect to the outwardly extending angular end portions 24 and 26 of legs 14. The construction of this barricade, as far as pivoting the legs around pivot pins and relieving the contiguous sides of the upper leg portion so they may open to a fixed angle is well understood by those skilled in the art, and requires no further explanation.

Referring now to FIG. 6, there is shown a preferred method of affixing boards 20 (and 22) to legs 14. Legs 14 are usually made of metal and boards 20 and 22 of some softer substance, such as wood, plastic or metal. Holes in registry with one another are provided in legs 14 and boards 20 and 22 of such a diameter that a short nail 28 must be driven into the holes to form a pressure fit with the holes in legs 14. After nail 28 is forced into the holes, its sharp projecting end portion is bent over such as by hammering. The method of joining boards 20 and 22 to leg 14 thereby provides a nonreleasable connection which has the advantage of beig inexpensive and rugged and which can only be disconncted by cutting the bent-over end and prying nail 28 from legs 14. This feature prevents ready disassembly of the barricade and thereby discourages a certain amount of theft and vandalism. Instead of providing boards 20 and 22 with holes, a nail may be driven through the board in the customary manner.

Referring now to FIGS. 2, 3 and 4, there is shown flasher construction 10 having a case 40 and a cover or lid 41. Cover 41 has a top member 34 and four side walls 35, 36, 37 and 38. Side walls 35 and 36 are provided with axially aligned circular openings 43 and 44 for engagement with a locking bolt 42. Openings 43 and 44 may be strengthened by inserting spur grommets (not shown).

Case 40 is made preferably, but not necessarily, of a polyethylene or some other material impervious to shock or extreme temperature conditions such as sheet metal, plastic or resin which is drawn into a substantially rectangular shaped open box having a deep U- shaped upward extending groove or channel 45 in its bottom surface which separates case 40 into two substantially equal size compartments 46 and 47. Channel 45, in addition to partitioning or compartmentalizing case 40 also serves to receive the shank portion of fastening bolt 42 when passed through openings 43 and 44 and locks cover 41 firmly to case 40. The groove 45 also serves as a strengthening member adding substantially to the strength and rigidity of the case.

Compartments 46 and 47 are dimensioned to accommodate a pair of batteries for powering a flasher circuit assembly 75. Selection of batteries depends on the desired operating voltage, the wattage rating and space requirements. A pair of six volt batteries such as the Burgess F4BW or an Everready NEDA 920 measuring 2½ x 2½ x 4 inches have been found eminently suitable for operating a number of well-known flasher circuit assemblies.

Since the main function of case 40 is to provide a suitable container for an electrical power source, a case having batteries potted thereto may be utilized. In fact, a most convenient configuration of a unitized case and battery construction (capsulated batteries) is to manufacture a battery having an outside configuration closely approximate case 40 so that cover 41 may be directly clamped to such a unitized case and battery combination by locking bolt 42. Replacement of batteries would therefore involve discarding the whole lower portion of flasher 10 and replacing it with another. In this manner, maintenance time is further reduced and a more solid and rugged battery portion for the flasher is achieved.

Cover 41 is made preferably of a high strength material such as polyethylene to which lamp black is added as a pigmentation to provide maximum stability to ultraviolet light. Such stability is desirable because cover 41 is constantly exposed to daylight. One plastic which has been found very useful and which can be vacuum molded with the resulting saving of not requiring expensive dies has been a product marketed by the Phillips Petroleum Company under the tradename MARLEX.

The top wall 34 of cover 41 is provided with a central clearance hole 50 through which the sleeve 52 of a locking collar 51 may be passed. Sleeve 52 is mounted upon the locking plate 54 of locking collar 51 and abuts against a seat 56 molded into the inner surface of top wall 34. The outwardly extending portion of sleeve 52 provides a means for supporting a head assembly 58. Head assembly 58 includes a circular body band 59 to which a support bracket 60 may be welded or riveted. Instead of utilizing a constructed head assembly, body band 59 and bracket 60 may be cast to provide a cast head assembly of one single piece.

A circular opening 61 is provided in bracket 60 for receiving sleeve 52. Sleeve 52 carries a retaining ring or washer 63, held in place against upward motion by a snap-on ring 64 which seats in a shallow groove 65. A head tension spring 66, of wave-like configuration, occupies the space between retaining ring 63 and bracket 60 shouldering on both and thereby urging barcket 60 downwardly against the upper surface of top wall 34 and sleeve 52 upwardly. The upwardly urging of sleeve 52 presses locking plate 54 firmly against seat 56. In this manner, head assembly 58 is firmly mounted upon cover 41 and remains rotatable about sleeve 52 through an angle of 360° while sleeve 52 is held against rotation by locking plate 54.

An alternate method of fastening head assembly 58 to cover 41 is shown in FIG. 7 in which like reference characters designate like parts. Instead of using a head tension spring for firmly pressing locking plate 54 and bracket 60 against opposite sides of the top wall 34, the space occupied by spring 66 may be packed with a resilient material. As shown in FIG. 7, a resilient washer 67, which may be rubber-backed canvas (such as a belting material), and dimensioned to extend against the upwardly turned end portions of bracket 60 and backed by a metallic washer 68 of similar configuration are tightly squeezed between bracket 60 and retaining ring 63. The reason for dimensioning both washers 67 and 68 to abut the upturned end walls of bracket 60 is so that they may be firmly held in place when bracket 60 is rotated. Also, during assembly, washer 68 is forced downward to compress resilient washer 67 until snap-in ring 64 is put in place.

A pair of acrylic or butyrate lenses 70 are mounted on opposite sides of head band 59 and secured to one another and head band 59 by means of three fastening devices such as bolts 71 and nuts 72. Such lenses are well known and are commercially available, by way of example, from the Signal-Stat Corp., Brooklyn, New York, under the trademrak "Cyclostat."

An electronic circuit 86 comprising components such as transistors, resistors and capacitor, an on-off switch 95, a pair of leads 89, 90 for connecting circuit 86 to batteries 91 and 92 and a pair of leads 87, 88 for connecting circuit 86 to a bulb fitting 79 are preferably encased in a conventional, hard potting compound. Potting electronic circuit 86 has the advantage of giving circuit 86 a body without the use of an additional support structure and making circuit 86 impervious to environmental conditions such as shock, dust, moisture and fungus. Also, such encapsulation provides a convenient body structure which provides support for a pair of fastening pins 81, 82 and a bulb fitting 79. Generally speaking, a circuit providing 50 to 60 flashes per minute having a dwell time of about 12 percent has been found satisfactory.

In accordance with one embodiment of the encapsulating body structure of this invention shown in FIGS. 2 and 3, a main body portion 76 encapsulating circuit 86 and switch 95 is provided with a stem portion 78 housing wires 87, 88 and supporting bulb fitting 79 at its end. Main body portion 76 and stem portion 78 are connected through collar portion 77 from which a pair of fastening means such as engagement pins 81 and 82 are outwardly depending. Portions 76, 77 and 78 form a single structure made of potting compound. Engagement pins 81, 82 engage a pair of lugs 84, 83 mounted upon or punched from locking plate 54 as shown in detail in FIG. 4. Stem portion 78 is dimensioned to pass through the inner bore of sleeve 52 and to telescope, upon being locked to locking plate 54, into the space between lenses 70. The encapsulating body structure is clamped in place by turning the structure so that pins 81, 82 engage and fit under lugs 83, 84.

Main body portion 76 of the encapsulating body structure includes electronic flasher circuit 86 whose output leads 87, 88 are connected to bulb socket 79. Power is applied to flasher circuit 86 through leads 89, 90 connected in parallel to batteries 91, 92 through suitable battery connector 93, 94. Of course, if desired, a higher voltage circuit may be utilized by either connecting the batteries in series or changing the batteries, or both. Lead 89 is connected to circuit 86 through a mercury switch 95, and lead 90 is directly connected to circuit 86. Mercury switch 95, also known as a gravity switch, opens whenever switch 95 is turned horizontally. Since switch 95 is potted into circuit assembly 75, the geometrical position of assembly 75 turns the assembly on and off. For example, a mercury switch may be selected which closes the circuit when stem portion 78 is vertical or close to its vertical position. Other mercury switches suitable for incorporating with this invention are those which only close the circuit when stem portion 78 is below the horizontal plane.

In certain applications it may be advantageous to restrict circuit operation to a predetermined range of angular positions such as, for example, angular positions of the stem portion falling within a cone subtending 45 degrees or even less with the vertical. In this manner, the flashing circuit may be switched on or off by merely tilting flasher construction 10 to and away from its upright position. This manner of controlling the operation of this flasher construction has the advantages of making an externally positioned switch unnecessary thereby reducing cost, increasing reliability and decreasing maintenance time. Also such a switch prevents an accidental turning on the unit and assures an automatic turning off when stored, thereby prolonging the useful life of the batteries.

Alternate embodiments of stem portions for carrying bulb fitting 79 are shown in FIGS. 8 and 9. In the embodiment shown in FIG. 8, a single steel wire 101 is utilized to provide the stem portion. Wire 101 is wound so that its center portion forms a short coil spring section 102, preferably but not necessarily tightly wound, for holding bulb fitting 79. Spring section 102 has an inner diameter which is slightly smaller than the outside diameter of fitting 79 so that fitting 79 may be forced into spring section 102 and is tightly held thereby. The remaining portions of wire 101 are bent into parallelism with the axis of coil spring section 102 to form a stem portion. The end portions of wire 101 are turned upward to form loops 103 and 104 and outward to form engagement pins 81 and 82. Loops 103 and 104 are made sufficiently large so that when potted into encapsulating main body portion 100, a secure, rigid and rugged bond is obtained. Leads 87, 88 are connected to fitting 79 and are not encased any further.

In the embodiment shown in FIG. 9, a plastic sleeve 106 has its lower end portion 107 encased in main body portion 108 and is supported thereby. Engagement pins 81 and 82 may comprise a single steel wire potted directly across the upper section of main body portion 108 making the collar portion 77 of FIG. 3 unnecessary. A bulb fitting 79 may be either directly forced into plastic sleeve 106 or may be press-fitted into a short sleeve 109 which is then pressed or cemented into sleeve 106.

Locking bolt 42 may be selected of sufficient length to pass through the pivot holes of one pair of legs 14 as shown in FIG. 1. This further simplifies constructional details in making special mounting holes unnecessary and also permitting tilting of the flasher about locking bolt 42 for operating mercury switch 95.

There has been described a flasher construction in which the flasher may be turned on and off by simply tilting the unit. All electrical circuitry is safely encased in a potting compound from which only a pair of battery leads (and in some certain embodiments a pair of bulb leads) are exposed. The whole flashing circuit may be replaced in minimum time. Further, a unique arrangement of parts is provided in which a cover is removable from the case by a single bolt which also serves to mount the flasher to the barricade. The cover rotatably supports the head assembly to provide 360° rotation for the lenses.

What is claimed is:

1. A signal device comprising: a battery accommodating case having a deep, upwardly extending, open groove across its width commencing at its bottom surface and partitioning the case; a cover including a top plate and downwardly depending side walls, at least one pair of downwardly depending side walls extending below the closed upper end of said groove, said one pair of side walls having openings in registry with one another and with the closed upper end portion of said groove; and a locking bolt passing through said openings and said groove to firmly and releasably secure said cover to said case.

2. A signal device comprising: a battery accommodating case including a deep U-shaped, upwardly extending, open groove across its width commencing at its bottom surface and partitioning the case; a cover including a top wall and downwardly depending side walls, one pair of oppositely disposed side walls extending below the closed upper end portion of said groove and having openings in registry with one another and with said closed end portion of said groove; a locking bolt passing through said openings and said groove to firmly and releasably secure said cover to said case; a head assembly including a body band and a pair of lenses clamped to opposite sides of said body band; and means of rotatably securing said head assembly to said top wall.

3. A signal device comprising: a case for accommodating a pair of battery means which include a deep U-shaped, upwardly extending, open groove across its width commencing at its bottom surface and partitioning the case; a cover including a top wall and downwardly depending side walls, one pair of oppositely disposed side walls extending below the closed end portion of said groove and having openings in registry with one another and with the closed end portion of said groove; a locking bolt passing through said openings and said groove to firmly and releasably secure said cover to said case; a locking collar having a locking plate urged upwardly against said top wall and a vertically extending cylindrical sleeve passing through an opening in said top wall; a head assembly including a body band and a pair of lenses clamped to opposite sides of said body band, said body band being provided with an opening for engaging said cylindrical sleeve and being urged downwardly against said top wall; and a signal lamp member including a body portion releasably clamped to said locking plate and a cylindrical stem portion slidably telescoped through the inner bore of said sleeve into said head assembly.

4. A signal device in accordance with claim 3 in which said body portion includes a closed capsule, an electronic circuit in said capsule having a pair of leads connected thereto, a portion of said pair of leads projecting from said capsule for connecting said circuit to a source of power.

5. A signal device in accordance with claim 4 in which said stem portion includes an encapsuled pair of wires and a lamp bulb fitting, said wires connecting said fitting to said circuit.

6. A signal device in accordance with claim 4 in which said stem portion comprises a further sleeve having one end encased in said body portion, a lamp bulb fitting held by the other end of said further sleeve, and a pair of wires connecting said fitting to said circuit.

7. A signal device in accordance with claim 4 in which said stem portion includes a wire means having a coil spring and two downwardly depending support members connected to said coil spring, a lamp bulb fitting held by said coil spring, and a pair of wires connecting said bulb fitting to said circuit, said support members being encased in said body portion.

8. A signal construction comprising: a barricade including two pairs of legs formed of metallic bar stock having holes along the lengths thereof, means including a locking bolt pivotally connecting each pair of legs at the upper ends thereof for limited angular separation, at least one cross panel extending between corresponding legs of said two pairs thereof, and metallic nails extending through said cross member and through holes in said corresponding legs, said nails being of a cross-section to fit tightly and be frictionally retained in said holes, and a signal device secured to said barricade and including a battery accommodating case having a deep U-shaped upwardly extending open groove across its width and commencing at its bottom surface; a cover including a top wall and downwardlly depending side walls, one pair of oppositely disposed side walls extending below the closed upper end portion of said groove and having openings in registry with one another and with said closed end portion of said groove; said locking bolt passing through said openings, said groove and one pair of said legs to firmly and releasably secure said cover to said case and to secure said signal device to said barricade; a head assembly including a body band and a pair of lenses clamped to opposite sides of said body band; and means of rotatably securing said head assembly to said top wall.

(References on following page)

References Cited by the Examiner

UNITED STATES PATENTS

| | | | |
|---|---|---|---|
| 1,778,556 | 10/1930 | Pitner | 182—155 |
| 1,983,174 | 12/1934 | Joerger et al. | 40—138 |
| 2,354,191 | 7/1944 | Bennett | 174—19 |
| 2,719,506 | 10/1955 | Sequeira | 116—63 |
| 2,742,174 | 4/1956 | Frieder et al. | 220—24 |
| 2,753,442 | 7/1956 | Wiswell | 240—10.65 |
| 2,824,771 | 2/1958 | Blenski | 182—155 |
| 2,880,405 | 3/1959 | Lerman | 340—81 |
| 2,885,539 | 5/1959 | McDermott | 240—53 |
| 2,931,026 | 3/1960 | Nelson | 340—81 |
| 3,015,804 | 1/1962 | Nunn | 340—45 |

NEIL READ, *Primary Examiner.*

BENNETT G. MILLER, *Examiner.*